United States Patent
Yuan et al.

(10) Patent No.: US 9,704,522 B2
(45) Date of Patent: Jul. 11, 2017

(54) MAGNETIC DISK, METHOD OF TRACK FOLLOWING ON A MAGNETIC DISK, AND METHOD OF WRITING A SERVO PATTERN IN A DEDICATED SERVO LAYER OF A MAGNETIC DISK

(71) Applicant: Marvell International Ltd., Hamilton (BM)

(72) Inventors: Zhimin Yuan, Singapore (SG);
Jingliang Zhang, Singapore (SG);
Chun Lian Ong, Singapore (SG);
Shiming Ang, Singapore (SG)

(73) Assignee: Marvell International LTD., Hamilton (BM)

(*) Notice: Subject to any disclaimer, the term of this patent is extended or adjusted under 35 U.S.C. 154(b) by 0 days.

(21) Appl. No.: 15/022,483

(22) PCT Filed: Sep. 17, 2014

(86) PCT No.: PCT/SG2014/000443
§ 371 (c)(1),
(2) Date: Mar. 16, 2016

(87) PCT Pub. No.: WO2015/041604
PCT Pub. Date: Mar. 26, 2015

(65) Prior Publication Data
US 2016/0232929 A1  Aug. 11, 2016

(30) Foreign Application Priority Data

Sep. 17, 2013 (SG) ................. 201307024-8

(51) Int. Cl.
*G11B 5/596* (2006.01)

(52) U.S. Cl.
CPC ...... *G11B 5/59666* (2013.01); *G11B 5/59655* (2013.01)

(58) Field of Classification Search
None
See application file for complete search history.

(56) References Cited

U.S. PATENT DOCUMENTS 4,286,296 A    8/1981  Cunningham
6,262,859 B1 *  7/2001  Cho ................. G11B 5/59633
                                                    360/48

(Continued)

FOREIGN PATENT DOCUMENTS

EP          0031500 B1    7/1981

OTHER PUBLICATIONS

International Search Report and Written Opinion of the ISA for PCT/SG2014/000443, ISA/AU, Woden ACT, mailed Nov. 24, 2014.

*Primary Examiner* — K. Wong

(57) ABSTRACT

Magnetic disk, method of track following on a magnetic disk, and method of writing a servo pattern in a dedicated servo layer of a magnetic disk. The magnetic disk comprises a servo pattern in a dedicated servo layer of the magnetic disk, the servo pattern having a first burst A and a second burst B arranged to be within one period of a servo sample, each of burst A and burst B comprising DC+ and DC− magnetic bursts; wherein a center of the DC+/DC− bursts of burst B is shifted relative to the DC+/DC− bursts of burst A in a substantially radial direction of the magnetic disk.

15 Claims, 5 Drawing Sheets

(56) References Cited

U.S. PATENT DOCUMENTS

| | | | |
|---|---|---|---|
| 6,366,423 B1 * | 4/2002 | Ahn | G11B 5/5526 360/77.02 |
| 6,768,609 B2 | 7/2004 | Heydt et al. | |
| 7,230,790 B1 | 6/2007 | Mallary et al. | |
| 7,746,595 B1 * | 6/2010 | Guo | G11B 5/59688 360/77.08 |
| 8,339,722 B1 * | 12/2012 | Wu | G11B 5/59688 360/46 |
| 2004/0252394 A1 | 12/2004 | Hamaguchi et al. | |
| 2013/0155826 A1 | 6/2013 | Zhang et al. | |

* cited by examiner

- Switch between burst A and burst B to ensure always working in the linear range of PES transfer curve.

MAGNETIC DISK, METHOD OF TRACK FOLLOWING ON A MAGNETIC DISK, AND METHOD OF WRITING A SERVO PATTERN IN A DEDICATED SERVO LAYER OF A MAGNETIC DISK

CROSS-REFERENCE TO RELATED APPLICATIONS

This application is a 371 U.S. National Stage of International Application No. PCT/SG2014/000443, filed Sep. 17, 2014, which claims the benefit of and priority to Singapore Patent Application No. 201307024-8, filed Sep. 17, 2013. The entire disclosures of both of the above applications are incorporated herein by reference.

FIELD OF INVENTION

The present invention relates broadly to a magnetic disk, a method of track following on a magnetic disk, and to a method of writing a servo pattern in a dedicated servo layer of a magnetic disk.

BACKGROUND

In typical magnetic disk drive systems, the separation of the writer 100 and the reader 102 on a read/write (R/W) head 104 is around 5 μm, as shown in FIG. 1. As a result, there is a significant variation of the read/write offset at the typical skew angle range of about −15° to +15°. This creates a continuous change of offset between reader 102 and writer 100 in the range of about −1.29 μm to +1.29 μm from the inner diameter (ID) to the outer diameter (OD) of the disk media.

During the writing process, the writer 100 has to be on track but the positioning error signal (PES) for servo has to be reproduced by the reader 102. Due to the continuous change of read/write offset, there are many areas where the offset of the reader 102 and the writer 100 is not an integer number of the data track width. In order to be "servo on" during the writing process, the reader 102 thus has to micro-jog away from the data track center. For a good servo performance during the writing process, the micro jog of the reader should be occurring in a linear region of the PES transfer curve.

In dedicated servo systems, a dedicated servo layer 200 is provided in the disk media 202, as illustrated in FIG. 2. With a larger spacing between the R/W head 204 and the dedicated servo layer 200 in the dedicated servo system, the servo track width in the dedicated servo layer 200 can be double that of the data track width in the recording layer 206, without increasing the nonlinear portion of the PES transfer curve. In the existing DC+/− servo pattern for dedicated servo systems, DC+ servo regions e.g. 300 alternate with DC− servo regions e.g. 302 as illustrated in FIG. 3. For the dedicated servo system, the DC+/− servo pattern has low media noise from the servo layer and has minimal interference to the data signal. It is considered the best choice of servo pattern in terms of the servo influence to data signal performance.

Having the width of the servo track 304 exactly twice the width of the data track 306 could provide an optimised scenario in which the micro jog would occur around the zero crossing point 308 of the PES transfer curve 310, i.e. in the linear region of the PES transfer curve 310. However, in practice the magnetic read width of the reader and the magnetic write width of the writer vary from R/W head to R/W head. Since the servo writing of servo tracks does not capture the widths variation of R/W heads, the scenario of operating at the zero crossing point 308 of the PES transfer curve 310 cannot be achieved, in practice. Instead, the reader servos at nonlinear regions of PES transfer curve 310 at many skew angles during the writing, and the servo performance will thus degrade when writing at certain locations.

In other words, the current dedicated DC+/− servo systems do not provide the full range of linear PES to support the full range of linear micro jog for variable read/write offset of R/W heads with different magnetic write width.

Embodiments of the present invention provide a magnetic disk, a method of track following on a magnetic disk, and a method of writing a servo pattern in a dedicated servo layer of a magnetic disk that seek to address at least one of the above problems.

SUMMARY

In accordance with a first aspect of the present invention there is provided a magnetic disk comprising a servo pattern in a dedicated servo layer of the magnetic disk, the servo pattern having a first burst A and a second burst B arranged to be within one period of a servo sample, each of burst A and burst B comprising DC+ and DC− magnetic bursts; wherein a center of the DC+/DC− bursts of burst B is shifted relative to the DC+/DC− bursts of burst A in a substantially radial direction of the magnetic disk.

In accordance with a second aspect of the present invention there is provided a method of track following on a magnetic disk as defined in the first aspect, the method comprising switching between track following using one or more of the bursts within said one period of the servo sample.

In accordance with a third aspect of the present invention there is provided a method of writing a servo pattern in a dedicated servo layer of a magnetic disk, the method comprising writing a first burst A and a second burst B in the dedicated servo layer and arranged to be within one period of a servo sample, each of burst A and burst B comprising DC+ and DC− magnetic bursts; wherein a center of the DC+/DC− bursts of burst B is shifted relative to the DC+/DC− bursts of burst A in a substantially radial direction of the magnetic disk.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Embodiments of the present invention relate to the use of a staggered DC+ and DC− servo pattern to realize the continuous servo and the full range linearity of PES in the dedicated servo application. At the same time, the servo signals can be used as the reference signal for synchronous writing.

In example embodiments of the present invention, a staggered DC+/DC− servo pattern is implemented which preferably provides a linear PES transfer curve over the whole radii of the disk media. This allows the dedicated servo system to handle the variable read/write offset for R/W heads with different magnetic write width and different magnetic read width.

The staggered DC+/DC− servo pattern according to an example embodiment has a first burst A and a second burst B inside one period of the servo sample. Both burst A and burst B include DC+ and DC− magnetic bursts and share one period of the servo sample. The center of the DC+/DC− bursts of burst B is shifted by half of the servo track width to that of burst A. This advantageously guarantees there is at least one of the servo bursts A and B working at its linear region of the PES transfer curve in each servo sample.

The staggered DC servo pattern can thus preferably provide a full linear range of the PES transfer curve in each data track.

When the burst A is used for track following, the burst B signals can be used to calibrate the PES from the DC servo pattern, as will be described below with reference to FIG. 6.

In an example embodiment of a dedicated servo system, there are a limited number of transitions of the servo signal in one data track. However, the servo signal has minimal impact to the bit error rate (BER) performance at the data layer in dedicated servo systems, and the transition signal can be used as the timing signal for the synchronous writing in two dimensional magnetic recording (TDMR), as will be described below with reference to FIG. 6.

The transitions are typically from the middle of DC+ and DC− to either DC+ or to DC−, which is half of the magnitude of transitions from DC− to DC+, and vice verse. Thus, the servo to data interference is around the half of that compared to the conventional DC servo pattern, where the transitions are typically from DC− to DC+, and vice verse. For example, if the media k value is 4, this interference is advantageously equivalent to the media with k=8 in example embodiments.

Figure 1:
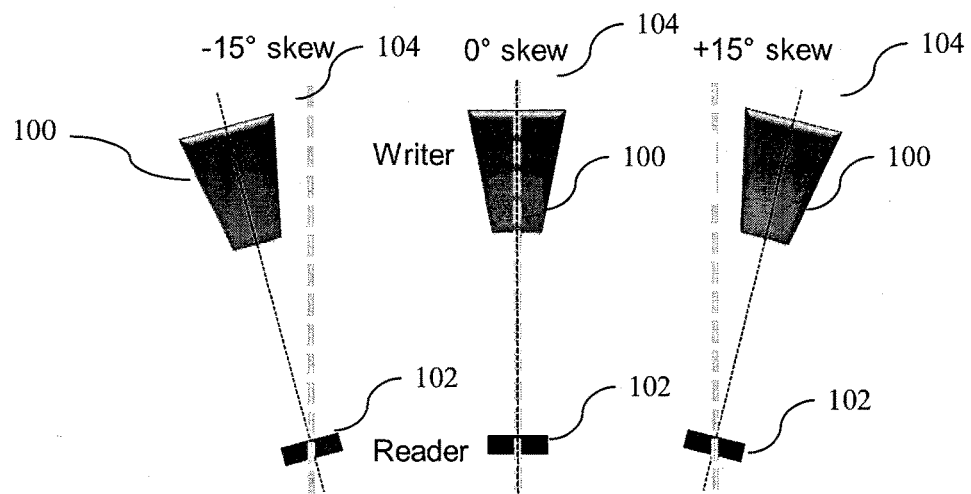
FIG. 1 shows a schematic drawing illustrating the offset of reader and writer changes at different skew angle.
Figure 2:
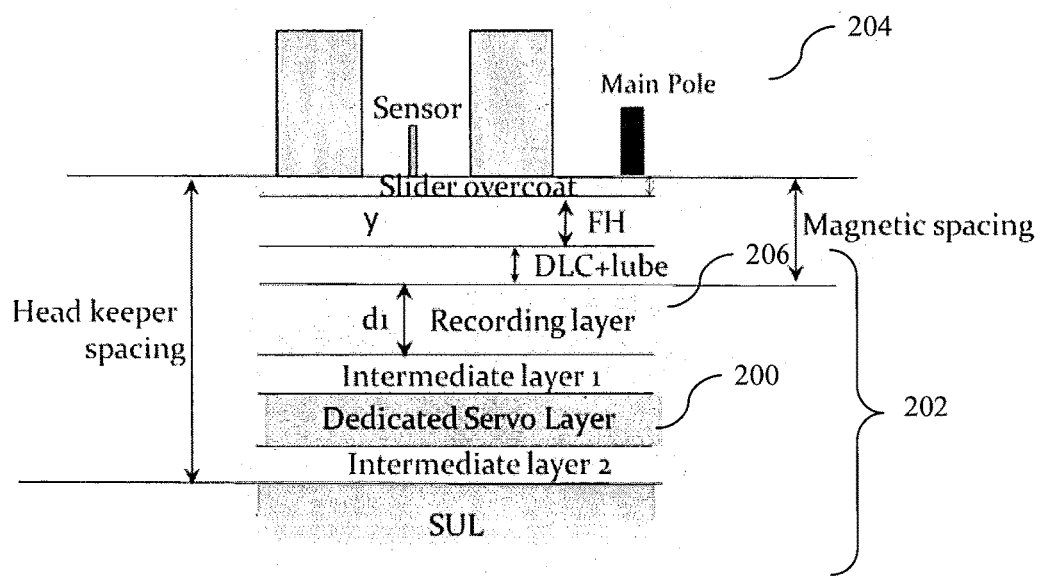
FIG. 2 shows a schematic drawing illustrating a dedicated servo layer in a magnetic disk.
Figure 3:
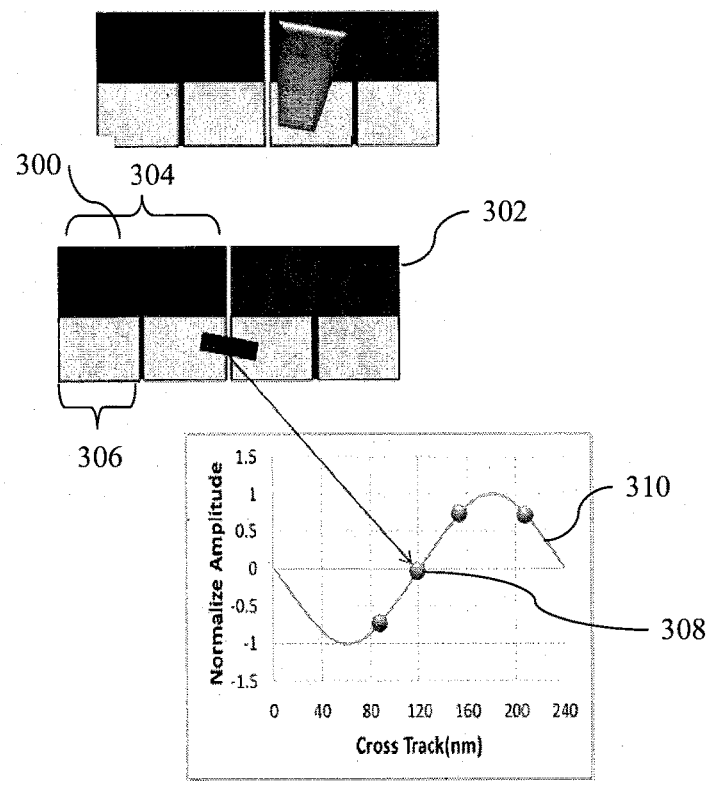
FIG. 3 shows a schematic diagram illustrating the existing DC+/− servo pattern for dedicated servo systems.
Figure 4:
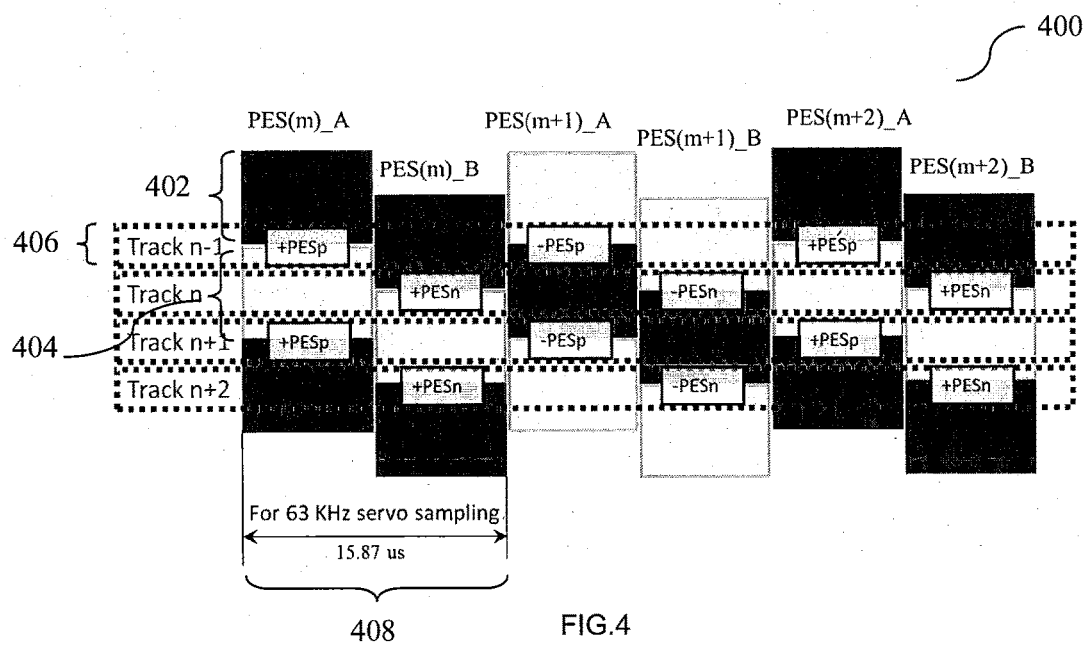
FIG. 4 shows a schematic diagram illustrating the layout of staggered DC+/DC− servo pattern at bottom servo layer versus the data tracks at top data layer, according to an example embodiment.

The staggered DC+/DC− servo pattern 400 according to one example embodiment is shown in FIG. 4. The servo track width e.g. 402, 404 of DC+ or DC− is around 2 times that of the data track width 406. In the example embodiment, there are 700 servo samples e.g. 408 over one disk revolution. At 5400 RPM spindle speed, the servo sampling frequency is 63 KHz. There are 2 servo bursts A and B over the period of one servo sample at 15.87 µs, i.e. both Burst A and Burst B share one servo sampling period. Burst B is offset by ½ of the servo track width to Burst A, resulting in the staggered DC+/DC− servo pattern 400.

Figure 5:
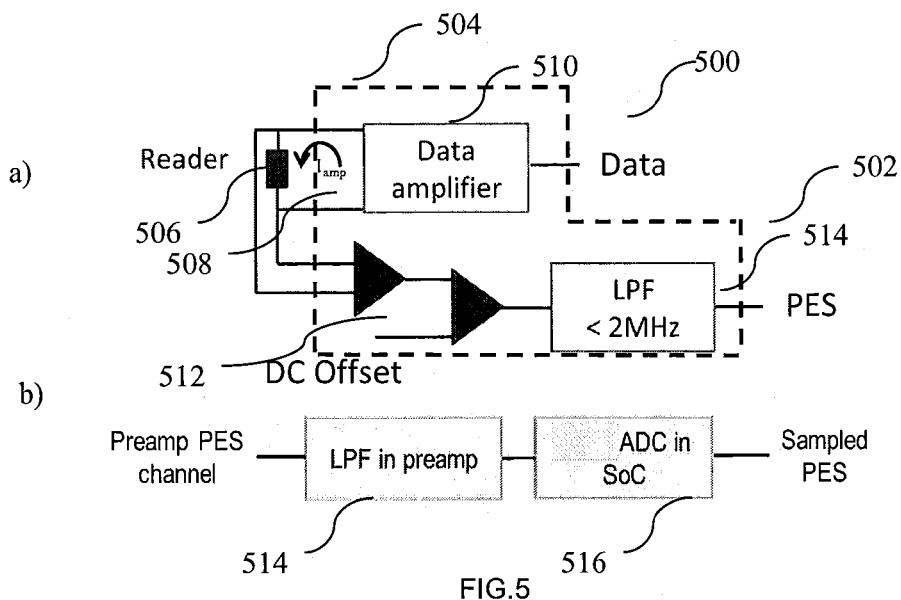
FIG. 5 shows a schematic drawing illustrating the data channel and the PES channel inside a preamplifier for PES processing, according to an example embodiment.

FIG. 5 shows two channels 500, 502 of electronics inside a preamplifier 504 to process the readback signals from the reader 506. The data channel 500 has the AC coupling indicated at numeral 508 and signal amplification in the data amplifier 510, which is the same as for a conventional preamplifier, as will be appreciated by a person skilled in the art. The PES channel 502 has a DC offset amplifier 512 and a low pass filter 514 for the signal conditioning of the PES. The analog PES from the preamplifier 504 is fed into a system-on-chip (SoC) with analogue-to-digital converter (ADC 516) preferably with at least 10-bits resolution and above. The continuous PES is digitized for averaging over a period of time, which can range from about 0.2 µs to the whole duration of burst A or burst B. This averaged PES will be one PES sample feeding into the servo control loop (not shown).

Figure 6:
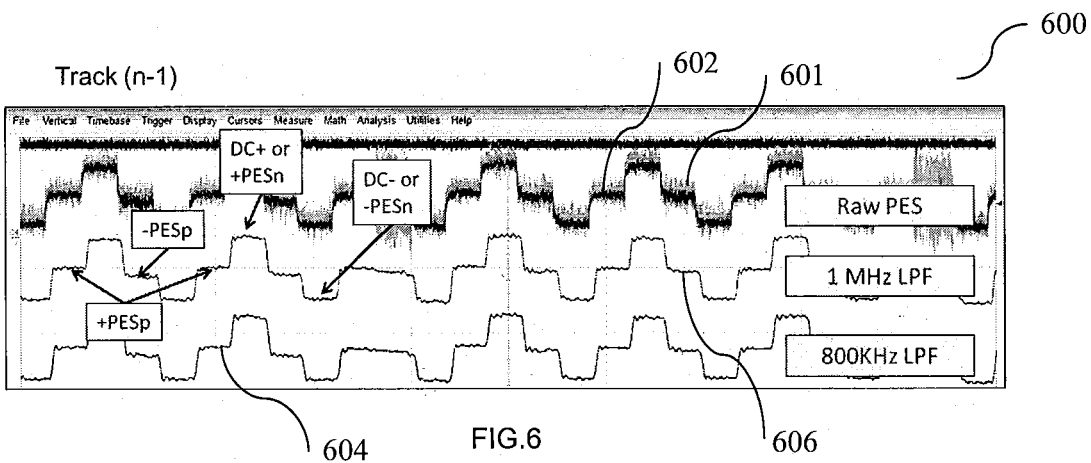
FIG. 6 shows a graph illustrating the measured PES from a magnetic disk with the servo pattern of FIG. 4.

FIG. 6 is a graph 600 showing the tested PES at data track (n−1) of the staggered servo pattern in FIG. 4. The trace 601 is the real time raw PES signal. The trace 602 is the averaged signal of trace 601 over 100 revolutions. The PES signals after 800 KHz low pass filter (LPF), trace 604, and after 1 MHz LPF, trace 606, are also averaged over 100 revolutions.

With reference to FIG. 6, when for example the PESp from burst A is used for track following, the PESn from burst B will be either at DC+ level or DC− level. If the PESp stays at the mean value of the continuous servo signal, the peak amplitude difference between DC+ and DC− corresponds to about two data track widths or one servo track width. Define V+ as the signal amplitude at the middle of DC+ (maximum signal) and V− as the signal amplitude at the middle of DC− (minimum signal), the PES in nm can be calculated by $(V-((V+)+(V-))/2)/((V+)-(V-))*TW$, where V is the voltage produced from PESp, and TW is the track width of the DC+/DC− servo track in nm.

Also with referenced to FIG. 6, the transitions when the reader moves from burst A to burst B or vice versa are in the shape of a substantially squarewave signal. The waveform of the staggered DC+/DC− servo signal can be reprocessed into a squarewave signal related to this servo signal frequency. The squarewave signal can be used as the clock reference signal for the phase lock loop (PLL). When the writing clock signal is synchronized with the PLL generated from the servo signal, the writing bits can advantageously be aligned precisely along down the track direction. When the TDMR requires to align the bits between two adjacent tracks, this PLL synchronous writing can preferably have the bits precisely aligned free of spindle speed and other form of jitters.

Figure 7:
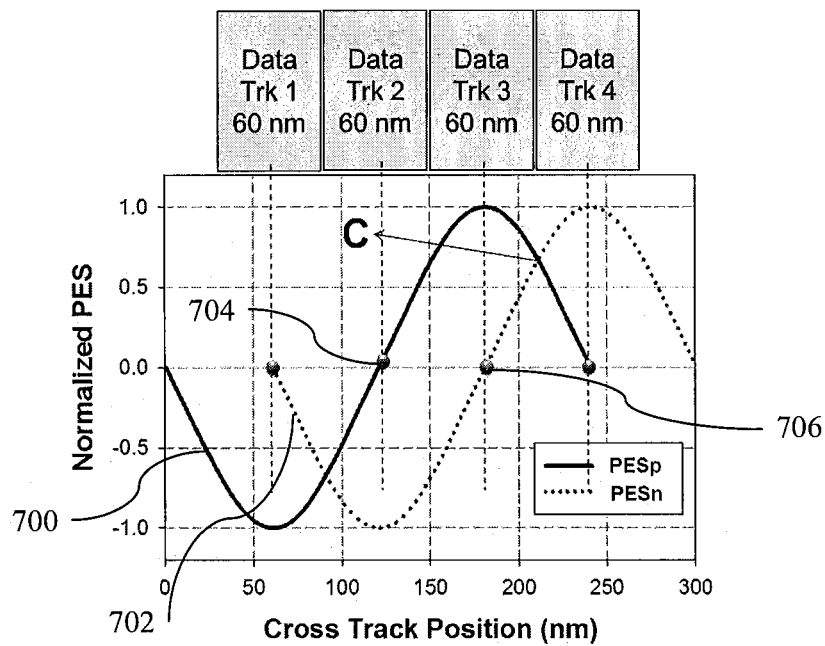
FIG. 7 shows a schematic diagram illustrating the desired data track alignment versus PES transfer curve of burst A (PESp) and burst B (PESn), according to an example embodiment.

FIG. 7 shows the normalized PES transfer curves 700, 702 of burst A and burst B respectively. In this example, the servo track width of the staggered DC+/DC− burst is 120 nm and the data track width is 60 nm. There is a 90° phase difference in the PES transfer curves 700, 702 between burst A and burst B. The PES of burst A are conjugated to the PES of burst B. In general, the data track center is preferred to be aligned at the zero crossing point, i.e. 704, 706, of the PES transfer curve. This location has the best PES quality in terms of both linearity and sensitivity of PES.

Figure 8:
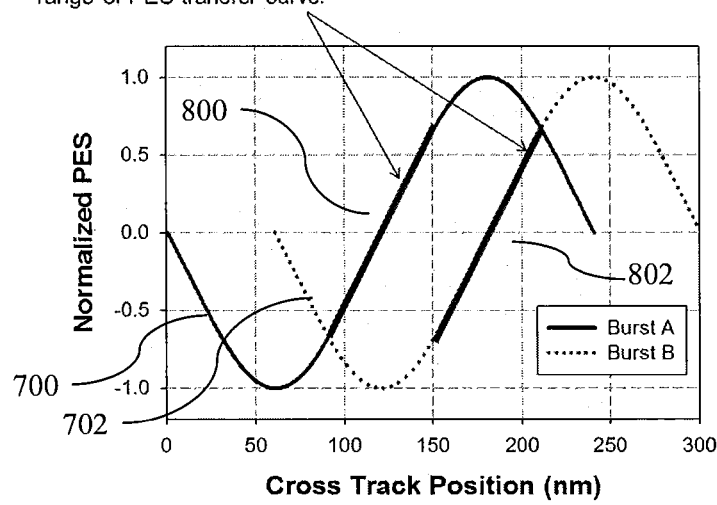
FIG. 8 shows a graph illustrating overlap of the linear regions of burst A and burst B to cover the whole area of servo pattern, according to an example embodiment.

FIG. 8 shows the switching between burst A and burst B can maintain the linearity of the overall PES transfer curve, i.e. comprised of the linear regions 800, 802 of the PES transfer curves 700, 702. Due to the longer duration of the servo burst in dedicated servo system, the track following at a particular track typically has to choose following either burst A or burst B. Using PES of both burst A and burst B would cause a PES delay and may leave too small a phase margin in the servo control loop, which can make the servo loop unstable.

Therefore, in a preferred embodiment, burst A is used for track following for odd track numbers, and bust B for even numbers, or vice versa. The respective other burst signals can be used to calibrate the PES from the DC servo pattern.

Figure 9:
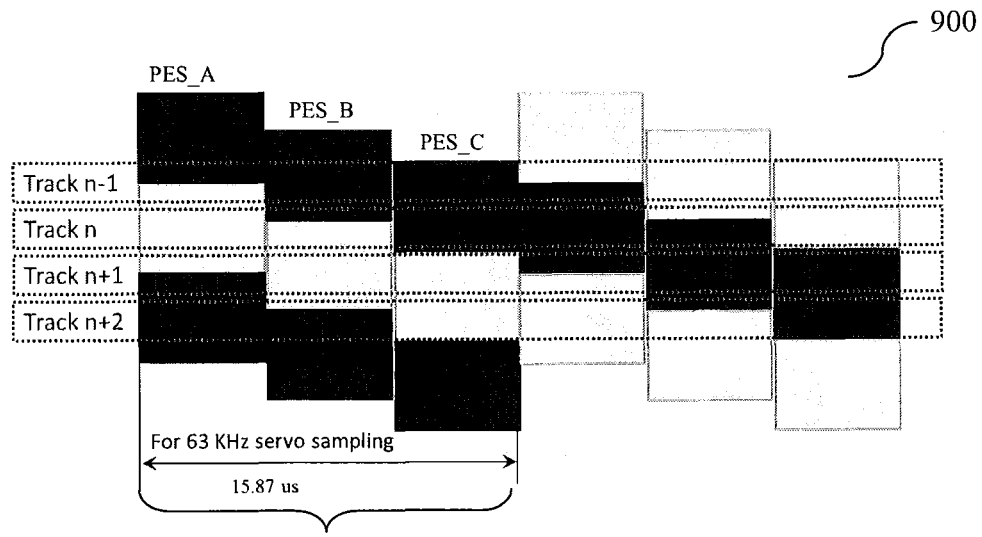
FIG. 9 shows a schematic diagram illustrating another staggered DC+/DC− servo pattern at servo layer to create the linear region of PES transfer curve, according to an example embodiment.
Figure 10:
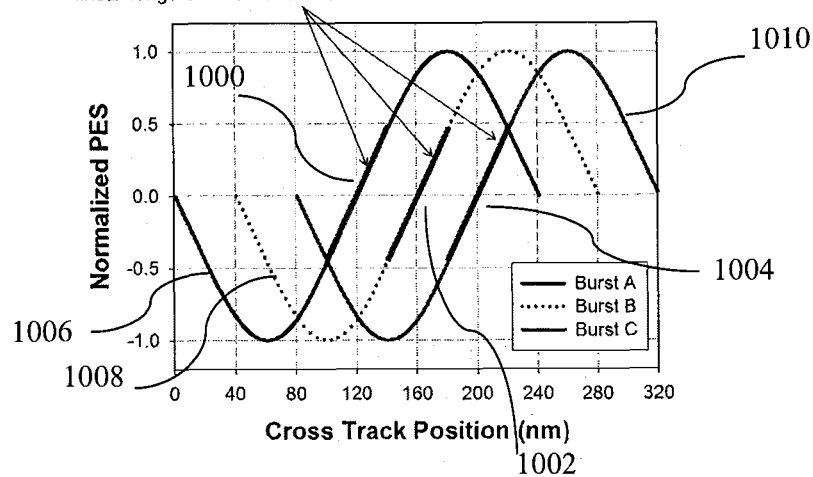
FIG. 10 shows a graph illustrating overlap the linear region of burst A, burst B, and burst C to cover the whole area of servo pattern according to an example embodiment.

The staggered DC+/DC− servo pattern 900 according to another example embodiment is shown in FIG. 9. The servo pattern 900 in FIG. 9 has 3 servo bursts A, B and C over the period of one servo sample 902 at 15.87 μs, i.e. Burst A, Burst B, and Burst C share one servo sampling period 902. Burst B is offset by ⅓ of servo track width to Burst A. Burst C is offset by ⅔ of servo track width to Burst A. Doing the burst switching illustrated in FIG. 10 among burst A, B, and C, can provide more overlap of the linear regions 1000, 1002, 1004 of the PES transfer curves 1006, 1008, 1010. This can preferably provide more tolerance to the linear area of PES transfer curve of burst A, B, and C. Returning to FIG. 9, in one example of micro-jog, track (n−1) follows burst C or burst A, track n follows on burst B or burst C, and track (n+1) on burst C or burst A. There is no extra delay for this. For example, the switching between bursts A and C depends on how the micro-jog moves. When the reader moves from track (n−1) towards track (n−2), it will switch from burst A to burst C. With reference to FIG. 10, when the reader micro-jogs from 120 nm to 100 nm, it follows burst A. When reader moves from 100 nm towards 80 nm range, it switches to burst C. With reference to the description above for the embodiment with two Bursts A and B (see e.g. FIG. 6), it will be appreciated that while there are more steps in the servo signals for the embodiment with three bursts A, B and C, the PES calibration can be still based on the DC+ (maximum) and DC− (minimum) signal amplitudes.

The offset control to implement the writing of servo patterns according to example embodiments of the present invention is understood by a person skilled in the servo writing process, and is therefore not described in any detail herein.

In one embodiment, a magnetic disk comprises a servo pattern in a dedicated servo layer of the magnetic disk, the servo pattern having a first burst A and a second burst B arranged to be within one period of a servo sample, each of burst A and burst B comprising DC+ and DC− magnetic bursts; wherein a center of the DC+/DC− bursts of burst B is shifted relative to the DC+/DC− bursts of burst A in a substantially radial direction of the magnetic disk.

The center of the DC+/DC− bursts of burst B may be shifted by about half of a servo track width to that of burst A.

The magnetic disk may further comprise a third burst C arranged to be within said one period of a servo sample, burst C comprising DC+ and DC− magnetic bursts, and wherein a center of the DC+/DC− bursts of burst C is shifted relative to the DC+/DC− bursts of burst B in the radial direction of the magnetic disk. The center of the DC+/DC− bursts of burst B is shifted by about ⅓ of a servo track width to that of burst A, and wherein the center of the DC+/DC− bursts of burst C is shifted by about ⅓ of the servo track width to that of burst B.

The magnetic disc may further comprise one or more additional bursts arranged to be within said one period of the servo sample, each of the one or more additional bursts comprising DC+ and DC− magnetic bursts, and wherein the centres of the DC+/DC− bursts amongst the bursts A, B, C and the one or more additional bursts are shifted relative to one another in a substantially radial direction of the magnetic disk. The centres of the DC+/DC− bursts amongst the bursts A, B, C and the one or more additional bursts may be shifted relative to one another by 1/n of the servo track width, where n is the total number of bursts in said one period of the servo sample.

In one embodiment, a method of track following on a magnetic disk of the above embodiment comprises switching between track following using one or more of the bursts within said one period of the servo sample.

When there are bursts A and B within said one period of the servo sample, the track following using the burst A may be performed for even data track numbers and the track following using the burst B may be performed for odd data track numbers, or vice versa.

When there are bursts A, B, and C within said one period of the servo sample, the track following for track (n−1) may use burst C or burst A, the track following for track n may use burst B or burst C, and the track following for track (n+1) may use burst C or burst A.

The method may further comprise using one or more of the bursts within said one period of the servo pattern not being used for track following for a particular data track number for calibration of a PES signal.

The method may further comprise using one or more transition signals between bursts within said one period of the servo sample as a timing signal for TDMR.

In one embodiment, a method of writing a servo pattern in a dedicated servo layer of a magnetic disk, comprises writing a first burst A and a second burst B in the dedicated servo layer and arranged to be within one period of a servo sample, each of burst A and burst B comprising DC+ and DC− magnetic bursts; wherein a center of the DC+/DC− bursts of burst B is shifted relative to the DC+/DC− bursts of burst A in a substantially radial direction of the magnetic disk.

The center of the DC+/DC− bursts of burst B may be shifted by about half of a servo track width to that of burst A.

The method may further comprise writing a third burst C in the dedicated servo layer and arranged to be within said one period of a servo sample, burst C comprising DC+ and DC− magnetic bursts, and wherein a center of the DC+/DC− bursts of burst C is shifted relative to the DC+/DC− bursts of burst B in the radial direction of the magnetic disk. The center of the DC+/DC− bursts of burst B may be shifted by about ⅓ of a servo track width to that of burst A, and wherein the center of the DC+/DC− bursts of burst C is shifted by about ⅓ of the servo track width to that of burst B.

The method may further comprise writing one or more additional bursts in the dedicated servo layer and arranged to be within said one period of the servo sample, each of the one or more additional bursts comprising DC+ and DC− magnetic bursts, and wherein the centres of the DC+/DC− bursts amongst the bursts A, B, C and the one or more additional bursts are shifted relative to one another in a substantially radial direction of the magnetic disk. The centres of the DC+/DC− bursts amongst the bursts A, B, C and the one or more additional bursts may be shifted relative to one another by 1/n of the servo track width, where n is the total number of bursts in said one period of the servo sample.

Embodiments of the present invention can have the following characteristics:

The staggered DC servo pattern provides the full linear range of PES transfer curve.

When the burst A is used for track following, the burst B signals can be used to calibrate the PES from DC servo pattern.

There are a limited number of transitions in one track of servo signal. It has the minimal impact to the BER performance at data layer. But this signal can be used as the timing signal for the synchronous writing in TDMR.

The transitions is usually from the middle of DC+ and DC− to either DC+ or DC−, which is the half of magnitude of transitions from DC− to DC+, vice verse. The servo to data interference is thus around the half of that using a conventional servo pattern. For example, if the media k value is 4, this interference is equivalent to the media with k=8.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features, in particular any combination of features in the patent claims, even if the feature or combination of features is not explicitly specified in the patent claims or the present embodiments.

For example, while the embodiments using two and three bursts have been described, it will be appreciated that the invention can be extended to more bursts in different embodiments. The offset amount depends on how many bursts within one servo sample are used, as will be appreciated from the above description by a person skilled in the art. For example, if four bursts (A, B, C, and D) are used over one servo sample in one embodiment, one step of the offset writing will be ¼ of the servo track width.

The invention claimed is:

1. A magnetic disk comprising:
a servo pattern in a dedicated servo layer of the magnetic disk, the servo pattern having a first burst A and a second burst B arranged to be within one period of a servo sample, each of burst A and burst B comprising DC+ and DC− magnetic bursts;
wherein:
a first center of a DC+ burst of the first burst A is shifted relative to a second center of a DC+ burst of the second burst B in a substantially radial direction of the magnetic disk by about 1/n of a servo track width, where n is a total number of bursts in the one period of the servo sample;
the second center of the DC+ burst of the second burst B is shifted relative to a third center of a DC− burst of the first burst A in a substantially radial direction of the magnetic disk by at least 1/n of the servo track width;
the third center of the DC− burst of the first burst A is shifted relative to a fourth center of a DC− burst of the second burst B in a substantially radial direction of the magnetic disk by about 1/n of the servo track width; and
the first center, the second center, the third center, and the fourth center are all shifted from each other.

2. The magnetic disk as claimed in claim 1, wherein, when the servo sample period does not include any bursts other than the first burst A and the second burst B, 1/n is about half of the servo track width.

3. The magnetic disk as claimed in claim 1, further comprising a third burst C arranged to be within said one period of the servo sample, burst C comprising DC+ and DC− magnetic bursts, and
wherein a fifth center of the DC+ burst of the third burst C is shifted relative to the second center of the DC+ burst of the second burst B by at least 1/n of the servo track width in the radial direction of the magnetic disk; and
a sixth center of the DC− burst of the third burst C is shifted relative to the fourth center of the DC− burst of the second burst B by 1/n of the servo track width in the radial direction of the magnetic disk.

4. The magnetic disk as claimed in claim 3, wherein, when the servo sample period does not include any bursts other than the first burst A, the second burst B, and the third burst C, 1/n is about ⅓ of the servo.

5. The magnetic disk as claimed in claim 3, further comprising one or more additional bursts arranged to be within said one period of the servo sample, each of the one or more additional bursts comprising DC+ and DC− magnetic bursts, and wherein the centers of the DC+/DC− bursts amongst the bursts A, B, C and the one or more additional bursts are shifted relative to one another in a substantially radial direction of the magnetic disk.

6. A method of track following on a magnetic disk, the method comprising:
switching between track following using one or more bursts of a servo pattern in a dedicated servo layer of the magnetic disk, the one or more bursts including:
a first burst A; and
a second burst B,
the first burst A and the second burst B being arranged to be within one period of a servo sample, and each of the first burst A and the second burst B comprising DC+ and DC− magnetic bursts,
wherein:
a first center of a DC+ burst of the first burst A is shifted relative to a second center of a DC+ burst of the second burst B in a substantially radial direction of the magnetic disk by about 1/n of a servo track width, where n is a total number of bursts in the one period of the servo sample;
the second center of the DC+ burst of the second burst B is shifted relative to a third center of a DC− burst of the first burst A in a substantially radial direction of the magnetic disk by at least 1/n of the servo track width;
the third center of the DC− burst of the first burst A is shifted relative to a fourth center of a DC− burst of the second burst B in a substantially radial direction of the magnetic disk by about 1/n of the servo track width; and
the first center, the second center, the third center, and the fourth center are all shifted from each other.

7. The method as claimed in claim 6, wherein the track following using the first burst A is performed for even data track numbers and the track following using the second burst B is performed for odd data track numbers, or vice versa.

8. The method as claimed in claim 6, wherein, when a third burst C is also within said one period of the servo sample, the track following for track (n−1) uses the third burst C or the first burst A, the track following for track n uses the second burst B or the third burst C, and the track following for track (n+1) uses the third burst C or the first burst A.

9. The method as claimed in claim 6, further comprising using one or more of the first and second bursts A and B within said one period of the servo pattern not being used for track following for a particular data track number for calibration of a PES signal.

10. The method as claimed in claim 6, further comprising using one or more transition signals between bursts within said one period of the servo sample as a timing signal for TDMR.

11. A method of writing a servo pattern in a dedicated servo layer of a magnetic disk, the method comprising:
    writing a first burst A and a second burst B in the dedicated servo layer and arranged to be within one period of a servo sample, each of the first burst A and the second burst B comprising DC+ and DC− magnetic bursts;
    wherein:
        a first center of a DC+ burst of the first burst A is shifted relative to a second center of a DC+ burst of the second burst B in a substantially radial direction of the magnetic disk by about 1/n of a servo track width, where n is a total number of bursts in the one period of the servo sample;
        the second center of the DC+ burst of the second burst B is shifted relative to a third center of a DC− burst of the first burst A in a substantially radial direction of the magnetic disk by at least 1/n of the servo track width;
        the third center of the DC− burst of the first burst A is shifted relative to a fourth center of a DC− burst of the second burst B in a substantially radial direction of the magnetic disk by about 1/n of the servo track width; and
        the first center, the second center, the third center, and the fourth center are all shifted from each other.

12. The method as claimed in claim 11, wherein, when the servo sample period does not include any bursts other than the first burst A and the second burst B, 1/n is about half of the servo track width.

13. The method as claimed in claim 11, further comprising writing a third burst C in the dedicated servo layer and arranged to be within said one period of the servo sample, the third burst C comprising DC+ and DC− magnetic bursts,
    wherein a fifth center of the DC+ burst of the third burst C is shifted relative to the second center of the DC+ burst of the second burst B by at least 1/n of the servo track width in the radial direction of the magnetic disk; and
    a sixth center of the DC− burst of the third burst C is shifted relative to the fourth center of the DC− burst of the second burst B by 1/n of the servo track width in the radial direction of the magnetic disk.

14. The method as claimed in claim 13, wherein, when the servo sample period does not include any bursts other than the first burst A, the second burst B, and the third burst C, 1/n about ⅓ of the servo track width.

15. The method as claimed in claim 13, further comprising writing one or more additional bursts in the dedicated servo layer arranged to be within said one period of the servo sample, each of the one or more additional bursts comprising DC+ and DC− magnetic bursts, and wherein the centers of the DC+/DC− bursts amongst the bursts A, B, C and the one or more additional bursts are shifted relative to one another in a substantially radial direction of the magnetic disk.

* * * * *